(No Model.) 5 Sheets—Sheet 1.

D. G. LANGLANDS & O. E. MOULTON.
MACHINE FOR TAPPING ELBOWS AND RETURN BENDS.

No. 403,199. Patented May 14, 1889.

(No Model.) 5 Sheets—Sheet 2.
D. G. LANGLANDS & O. E. MOULTON.
MACHINE FOR TAPPING ELBOWS AND RETURN BENDS.
No. 403,199. Patented May 14, 1889.
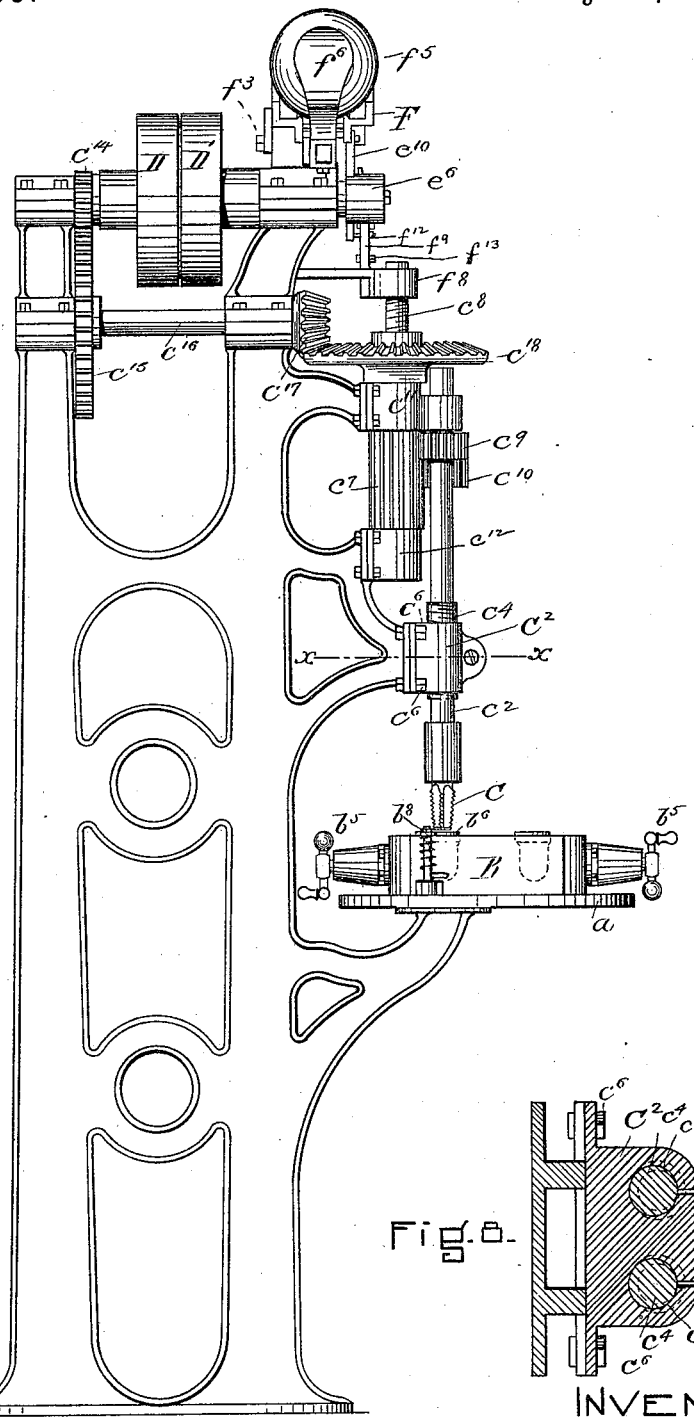
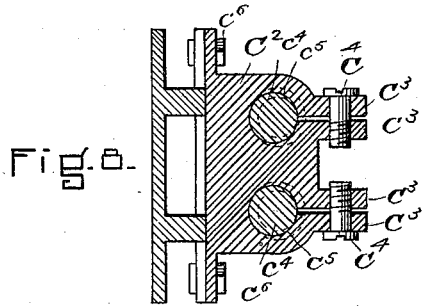
Fig. 2.
Fig. 8.
WITNESSES.
INVENTOR.

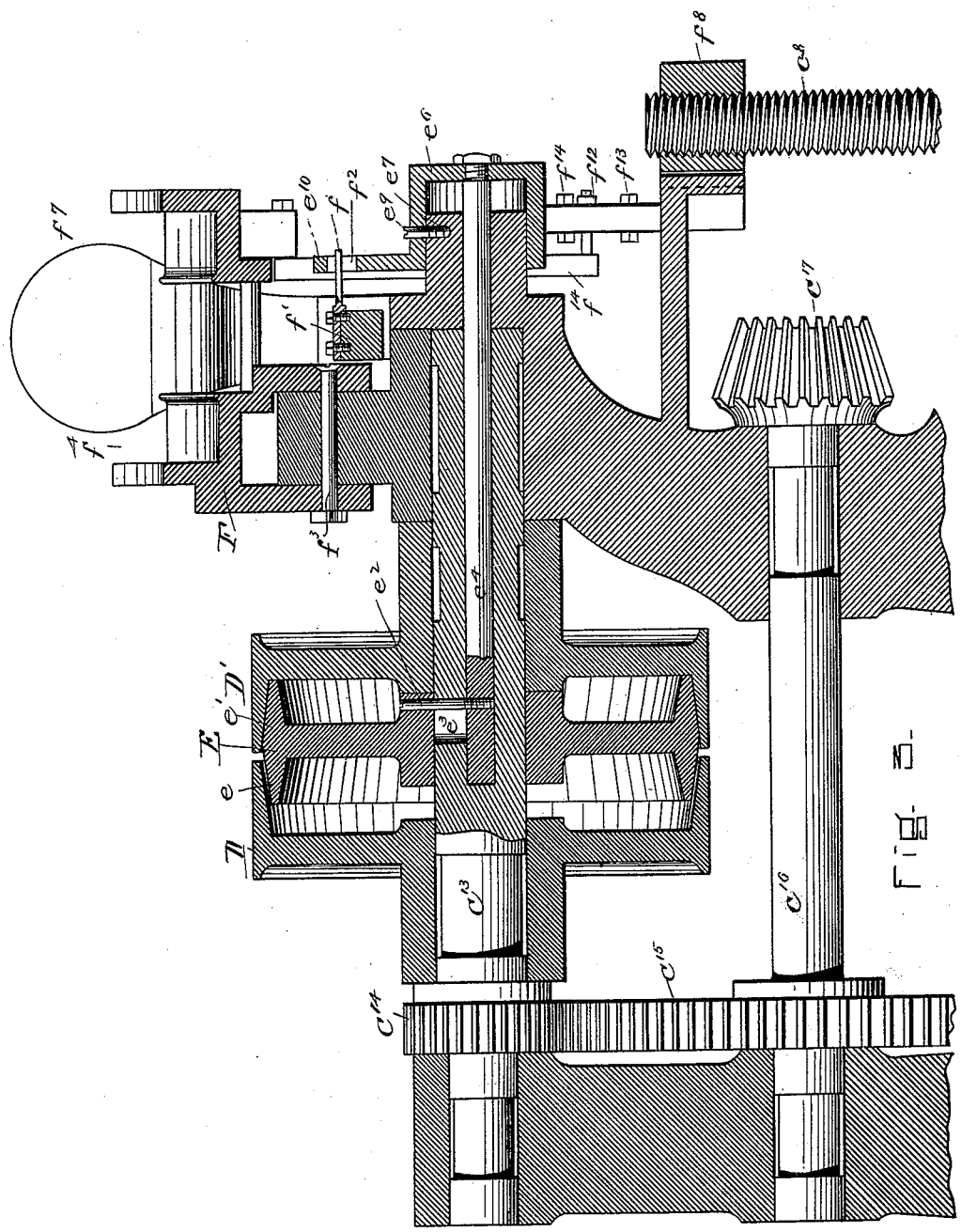

(No Model.) 5 Sheets—Sheet 4.

D. G. LANGLANDS & O. E. MOULTON.
MACHINE FOR TAPPING ELBOWS AND RETURN BENDS.

No. 403,199. Patented May 14, 1889.

WITNESSES. INVENTOR.

UNITED STATES PATENT OFFICE.

DANIEL G. LANGLANDS AND OTIS E. MOULTON, OF DOVER, NEW HAMPSHIRE, ASSIGNORS TO THE SOMERSWORTH MACHINE COMPANY, OF SAME PLACE.

MACHINE FOR TAPPING ELBOWS AND RETURN-BENDS.

SPECIFICATION forming part of Letters Patent No. 403,199, dated May 14, 1889.

Application filed November 7, 1887. Serial No. 254,572. (No model.)

*To all whom it may concern:*

Be it known that we, DANIEL G. LANGLANDS and OTIS E. MOULTON, both of Dover, in the county of Strafford and State of New Hampshire, both citizens of the United States, have invented a new and useful Improvement in Machines for Tapping Elbows, Pipe-Fitting, and Couplings, of which the following is a full, clear, and exact description, reference being had to the accompanying drawings, forming a part of this specification, in explaining its nature.

The object of our invention is to provide an improved boring or tapping machine, whereby both ends of a U-shaped pipe-coupling may be simultaneously bored or tapped; and our invention consists in certain improved combinations and arrangements of parts, as indicated by the claims appended to this specification.

Figure 1:
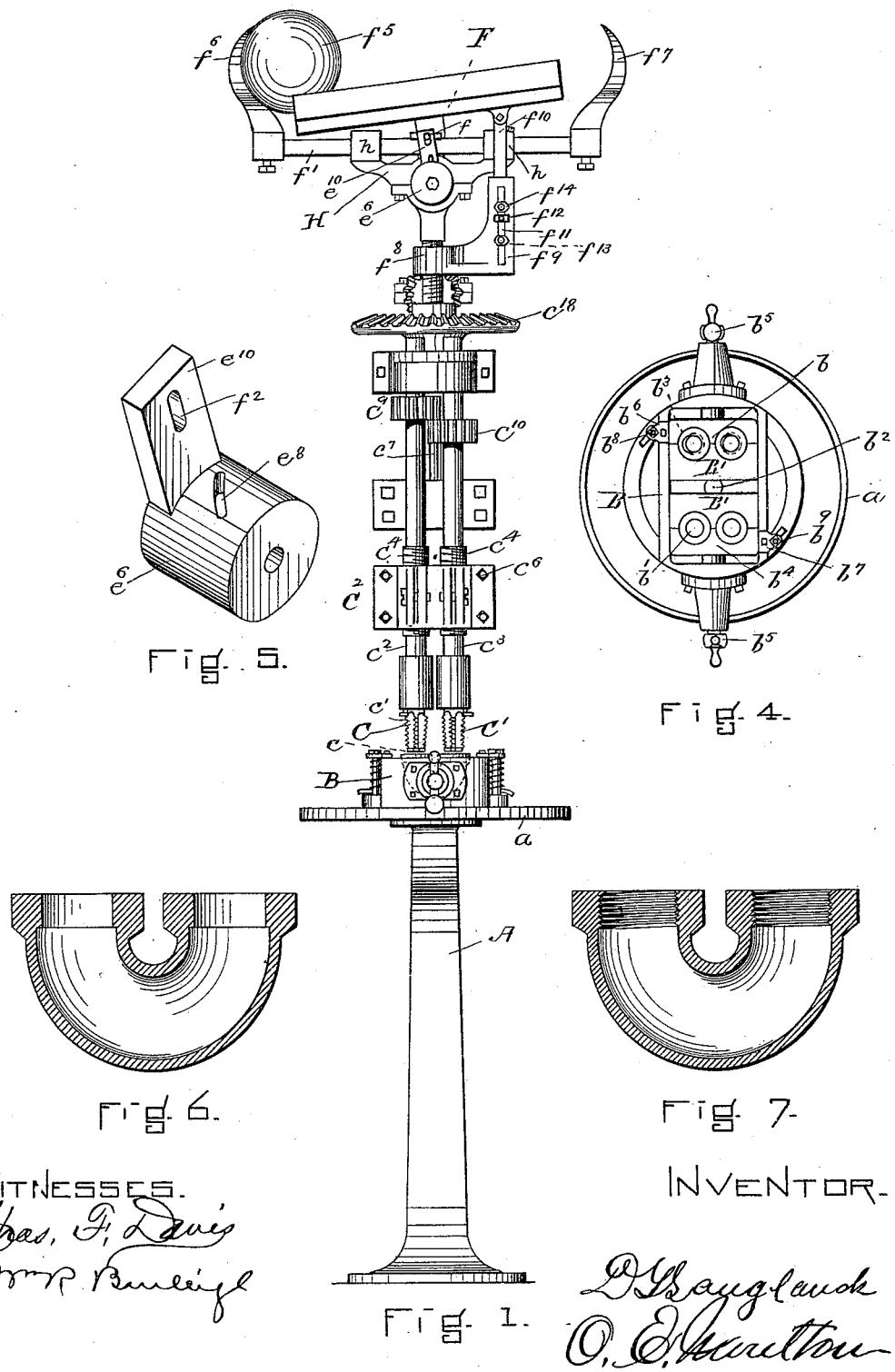
Figure 9:
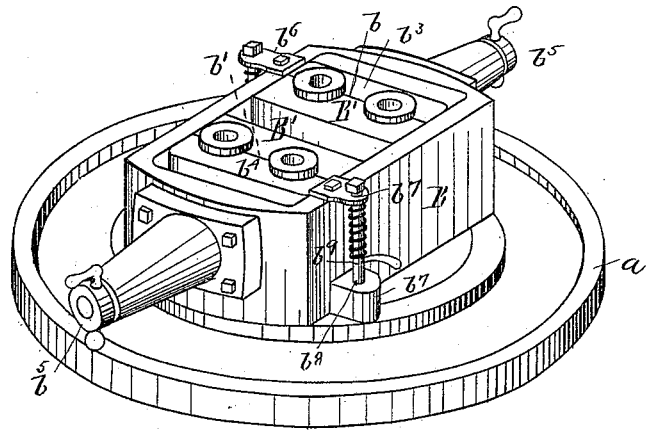
Figure 11:
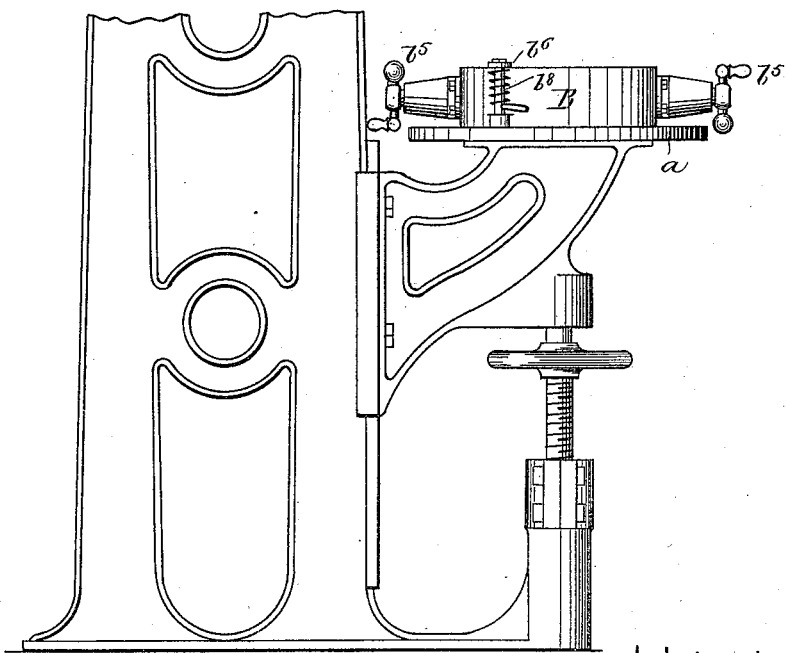
Figure 10:
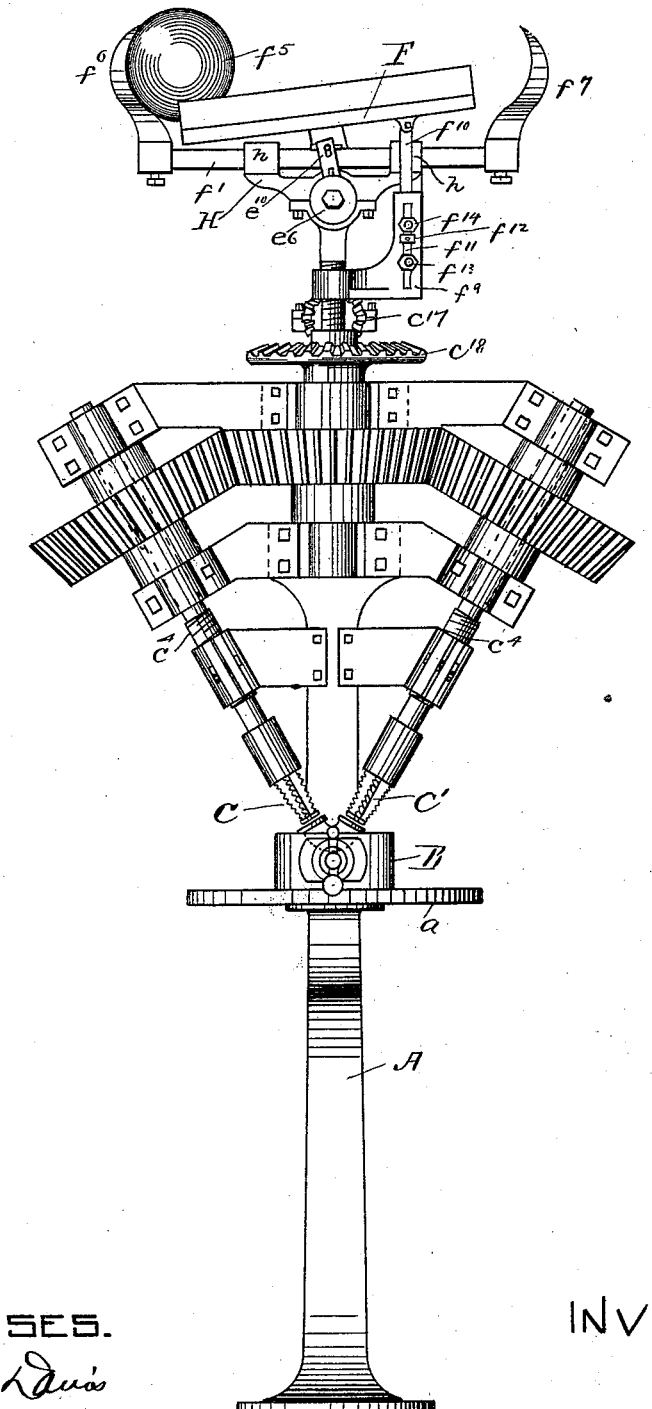

In the drawings, Figure 1 is a view in front elevation of the machine. Fig. 2 is a view in side elevation thereof. Fig. 3 is a vertical section, enlarged, of the upper part of the machine to represent especially the automatic shipping and reversing mechanism. Fig. 4 is a view in plan of the table and fittings-holder supported thereby. Fig. 5 is a view in perspective, enlarged, of a portion of the shipping device, to which reference will hereinafter be made. Fig. 6 is a view illustrating the form of coupling known as a "U-coupling," unfinished or untapped. Fig. 7 represents in vertical section the same form of coupling completed. Fig. 8 is a section upon the dotted lines $x$ $x$ of Fig. 2. Fig. 9 is a view in perspective of the bed and coupling-holder. Fig. 10 represents a change in the arrangement of the taps. Fig. 11 is a view representing the bed as provided with a vertical adjustment.

Referring to the drawings, A is the frame of the machine. $a$ is a table or bed, which may be stationary, as represented in Figs. 1 and 2, or may be made vertically adjustable, as represented in Fig. 11, to provide increased range to the machine. The table supports a shoe or holder, B, for supporting the joint or coupling to be tapped. It preferably is provided with two coupling-holding clamps, $b$ $b'$, and is attached to the bed $a$ by means of a pivot, $b^2$, so located in relation to the taps as to bring one of the two clamps in line therewith and the other into a position from which a tapped coupling can be removed and an untapped one be inserted. (See Fig. 2.) The shoe or support may have any usual form of clamping device for holding the couplings, and we have represented it as provided for this purpose, with the movable jaw $b^3$ at one end and the movable jaw $b^4$ at the other end. Each jaw is movable by means of a screw, $b^5$, in relation to a stationary or fixed abutment, B', and the inner edge of the jaw and the abutment may have recesses of any desired shape for properly holding and clamping the coupling in place. We would not be understood as claiming this form of jaw or clamp, as it is the one ordinarily used for this purpose.

To lock the shoe or holder upon the table so that one of the holders and the coupling it carries may register with the taps, we have provided the shoe with the arms or projections $b^6$ $b^7$, diagonally arranged in relation to each other, as represented in Figs. 4 and 9, one set of which extends from one side of the holder near one end and the other from the opposite side of the holder near the other end. Each set of these projections has a hole, $b^8$, which holds the spring-pin or register end $b^9$, the lower end of which enters a register-hole in the bed or table $a$, each pin being forced downward automatically by a spring into a hole, thus locking the shoe or holder to the bed.

In Figs. 1 and 2 we have represented the taps as arranged for tapping parallel holes in a U-coupling, and in Fig. 10 we have represented the taps as arranged at an angle in relation to each other to simultaneously tap the ends of a coupling at an angle.

C C' are the taps, and they preferably are of the kind referred to in our application of even date herewith—that is, a tap which has in addition to the screw-thread cutters a drilling or boring cutter which prepares the hole in advance for the action of the tap, and each tool therefore has the drilling, boring, or cutting section $c$ and the tapping-section $c'$. The tap C is mounted at the lower end of the spindle $c^2$, and the tap C' at the lower end of the spindle $c^3$. Each spindle has a screw-thread, $c^4$, and a stationary nut, $c^5$, which serves upon the rotation of the spindle to move it vertically. The two nuts are formed in a block, $C^2$, attached to the frame of the machine by the bolts $c^6$. (See Figs. 1, 2, and 8.) The nuts preferably are split (see Fig. 8) and provided with lugs $C^3$ and clamping-bolts $C^4$, by which they may be made to tightly fit the screw-thread of the spindles. The two spindles are simultaneously rotated by means of the long pinion $c^7$ upon the shaft $c^8$, the said pinion being connected with the spindle $c^4$, upon which the tap C is mounted, by means of the pinion $c^9$, and with the spindle $c^4$, upon which the tap C' is mounted, by means of the pinion $c^{10}$. Each of these pinions is fast to its respective shaft and travels up and down with it upon the long pinion $c^7$. The shaft $c^8$, carrying the long pinion, is mounted upon the frame A by means of bearings $c^{11}$ $c^{12}$, (see Fig. 2,) and motion is imparted to it from the pulley-shaft $c^{13}$ through the pinion $c^{14}$ thereon, the gear $c^{15}$ upon the intermediate shaft, $c^{16}$, and the bevel-gear $c^{17}$ at the front end of the shaft $c^{16}$, which meshes with the bevel-gear $c^{18}$ upon the long-pinion shaft $c^8$.

The movement of the pulley-shaft $c^{13}$, and consequently of the taps C C', is automatically reversed by means of a horizontal table adapted to be tipped in part by the action of the machine and part by a weight or ball movable thereon, which table is connected with a member of a clutch in a manner to move the member first in engagement with a pulley turning in one direction and then in engagement with a pulley turning in the reverse direction.

D represents one of these pulleys and D' the other. They are both loosely mounted upon the shaft $c^{13}$.

E represents the clutch, and it has two engaging-sections, $e$ $e'$. It is mounted upon the shaft $c^{13}$ to revolve therewith, and is alternately brought into contact with the pulley D and the pulley D'. To accomplish this, the clutch is connected, by means of a pin, $e^2$, passing through a slot, $e^3$, in the shaft $c^{13}$, to a horizontally-movable rod, $e^4$, movable in a horizontal hole formed centrally in the shaft from one end. This rod $e^4$ extends beyond the end of the shaft and is free to rotate in a cam, $e^6$, which is attached to the end of the rod in a manner to permit it to be rotated and also to permit it to move the rod in a horizontal direction. The cam is cylindrical in shape, and has a bearing upon the boss $e^7$ on the frame and a spiral slot, $e^8$, (see Fig. 5.) through which a cam-pin, $e^9$, fastened to the boss, extends. It also has an arm, $e^{10}$. It is obvious that upon the movement of this cam upon the boss in one direction or the other it is moved inward or outward in relation thereto, thereby moving the rod $e^4$ inward or outward and causing the clutch E to be engaged either by the pulley D or the pulley D'.

To move the cam at the proper interval of time, we have connected the arm $e^{10}$ with the cross-bar $f'$ by means of a pin or rod, $f$, which extends from the cross-bar $f'$ into a slot, $f^2$, in the arm $e^{10}$. (See Fig. 3.) The tilting table F is pivoted at $f^3$ and has a guideway, $f^4$, upon which the ball $f^5$ is free to travel between the stops $f^6$ $f^7$ from one end of the table to the other or from one stop to another, according as the table is inclined. The cross-bar $f'$ is supported by and is adapted to slide in ears $h$ of the support H, forming part of the frame-work of the machine.

To change the inclination of the table, we have connected it with the long-pinion shaft $c^8$ by means of a nut, $f^8$, on the upper end of the shaft $c^8$, the shaft having a screw-thread which enters the nut. As the shaft is rotated, the nut is moved up and down. This nut has an arm, $f^9$, which is connected with the tilting table F by means of the link $f^{10}$. (See Fig. 1.) The link has a loose connection with the arm $f^9$—that is, it has a certain amount of lost motion in relation thereto. This is obtained by providing the arm $f^9$ with a long slot, $f^{11}$, and a stop, $f^{12}$, across the same, and the link $f^{10}$ with two stops, $f^{13}$ $f^{14}$, one of which (the stop $f^{13}$) is below the stop $f^{12}$ and the other (the stop $f^{14}$) above it. The downward movement of the nut $f^8$ and its arm brings the stop $f^{14}$ into contact with the stop $f^{12}$, and maintains that contact until the table F has been moved to a horizontal position, or a little beyond a horizontal position, sufficient to start the ball thereon from its stop $f^6$. The ball then moves down the table to its opposite end and throws or moves it much faster than the nut $f^8$ is traveling, the link moving downward unrestrained in the slot $f^{11}$ until its stop $f^{12}$ comes in contact with the stop $f^{13}$. The ball coming in contact with the stop $f^7$ moves the cross-bar $f'$, to which is attached the pin or rod $f$, extending into the slot $f^2$ in the arm $e^{10}$ of the cam $e^6$. This motion of the cross-bar with its connections, as above described, causes the cam $e^6$ to revolve or oscillate upon its bearing, $e^7$, in which is the fixed pin $e^9$, playing in the spiral groove $e^8$, and causing the cam $e^6$, while revolving about or oscillating upon the bearing $e^7$, to also move in and out thereon, carrying with it the rod $e^4$, attached to the clutch E, thereby disengaging the clutch E from one driven pulley and engaging it with the other. This reverses the movement of the taps and their spindles, and consequently of the nut $f^8$, which then through its arm $f^9$ serves to lift the end of the table, which it previously drew down sufficient to cause it to be inclined in the opposite direction, and causes the ball to travel backward again to its original position, and thereby cause the clutch to be disengaged and returned to its original position.

The time of operation of the table, and consequently of the clutch, is varied by vertical adjustment of the stops $f^{13}$ $f^{14}$, they being vertically movable upon the arm $f^9$, whereby they may be moved toward or from each other. This governs the length of the movement of the spindles, and it may be of any desired length, according to the relation which the stops $f^{13}$ $f^{14}$ bear to each other.

In Fig. 10 we have shown the spindles and taps inclined in relation to each other, and this necessitates the employment of bevel-gear connection between the shaft $c^8$ and the tap-spindles instead of the connection represented in Figs. 1 and 2. In this event the bevel-gears upon the spindles will not travel with them, the spindles being connected with them by splines in a manner to permit their moving in relation to them.

By means of the devices herein described, or devices embodying these essential elements herein specified, elbows and joints may be very cheaply and uniformly tapped, and with the construction represented in Figs. 1 and 2 the machine is practically constantly in operation—that is, the operation is simply to remove and place the joint or elbow in one part of the holder or shoe while the machine is working upon another coupling or elbow held in another part of the machine.

By arranging our rotating and simultaneously-reciprocating tap-carrying spindles both side by side and parallel to each other, and separated just the proper distance to enter the opposite ends of a U-shaped coupling, we are enabled to tap both ends of couplings of this kind at one operation and in such a manner that both of the threaded parts thereof will be exactly parallel to each other, thereby obviating a difficulty which has heretofore been experienced in securing this result.

Having thus fully described our invention, we claim and desire to secure by Letters Patent of the United States—

1. In a tapping-machine, the combination, with a work support or table, of a work-holder pivotally mounted thereon and having two clamps for holding a coupling and two rotating and reciprocating tap-carrying spindles arranged side by side and parallel to each other, and separated a proper distance to cause their taps to enter the opposite ends of a U-shaped coupling, said spindles moving simultaneously in the same direction toward and from the said table, substantially as set forth.

2. In a tapping-machine, the combination, with a work support or table, of a work-holder pivotally mounted thereon and having two clamps for holding a coupling, two rotating and reciprocating tap-carrying spindles arranged side by side and parallel to each other, and separated a proper distance to enable their taps to enter the opposite ends of a U-shaped coupling, a driving mechanism for rotating and simultaneously reciprocating said spindles to cause them to move toward and from the said table in the same direction together, and an automatic reversing mechanism for the said driving mechanism, substantially as set forth.

3. In a tapping-machine, the combination, with the taps and their spindles and driving-gearing, of a driving-shaft carrying a clutch, two reversely-driven loose pulleys on said shaft, a tilting table, a weight or ball to roll on said table, a sliding bar having two stops to be engaged by said weight or ball, and connections between said sliding bar and the said driving-gearing and clutch, whereby when the tap-spindles have traveled endwise a certain desired distance in one direction the said table will be tilted, the clutch moved, and the direction of rotation of the said driving-shaft thus automatically reversed, as set forth.

4. The combination, in a machine for tapping couplings, elbows, &c., of the taps C C', their spindles $c^4$, the nuts $c^5$, the long pinion $c^7$, and the pinions $c^9$ $c^{10}$, as and for the purposes described.

5. The combination of the taps C C', spindles $c^4$, the shaft $c^{13}$, connected with the spindles, substantially as specified, the nuts $c^5$, the pulleys D D', the clutch E, and a traveling nut, $f^8$, connected with the clutch E by means of the tilting table F, the slide-rod $e^4$, cam $e^6$, link $f^{10}$, arm $f^9$, and pin $f^2$, and the ball $f^5$, substantially as described.

6. The combination of the spindle $c^4$, the taps C C' carried thereby, the shaft $c^{13}$, connected with the spindle $c^4$, substantially as specified, the pulleys D D', slide-clutch E, the rod $e^4$, cam $e^6$, tilting table F, connected with the cam, the nut $f^8$, the arm $f^9$, having the long slot $f^{11}$, the link $f^{10}$, its stop $f^{12}$, the stops $f^{13}$ $f^{14}$ upon the arm $f^9$, and the weight $f^5$, substantially as described.

DANIEL G. LANGLANDS.
OTIS E. MOULTON.

Witnesses:
W. R. BURLEIGH,
F. F. RAYMOND, 2d.